United States Patent [19]

Krueger et al.

[11] 4,266,383
[45] May 12, 1981

[54] SOLAR ENERGY COLLECTOR

[75] Inventors: Wallace F. Krueger, Toledo; Anthony R. Shaw, Waterville, both of Ohio

[73] Assignee: Libbey-Owens-Ford Company, Toledo, Ohio

[21] Appl. No.: 17,428

[22] Filed: Mar. 5, 1979

Related U.S. Application Data

[63] Continuation-in-part of Ser. No. 892,110, Mar. 31, 1978.

[51] Int. Cl.³ .............................. E06B 3/64; F24J 3/02
[52] U.S. Cl. ...................................... 52/400; 126/450; 52/398
[58] Field of Search .................. 126/450; 52/398, 400; 49/489, 490, 441

[56] References Cited

U.S. PATENT DOCUMENTS

| 943,801 | 12/1909 | Watson . | |
|---|---|---|---|
| 1,862,705 | 6/1932 | Reid | 49/441 |
| 2,641,031 | 6/1953 | Ehret | 52/400 |
| 2,698,072 | 12/1954 | Beck | 52/400 |
| 2,772,915 | 12/1956 | Renno | 52/400 |
| 3,171,886 | 3/1965 | Holt et al. | 52/400 |
| 3,201,831 | 8/1965 | Cudini | 52/400 |

Primary Examiner—Samuel Scott
Assistant Examiner—Lee E. Barrett
Attorney, Agent, or Firm—Collins, Oberlin & Darr

[57] ABSTRACT

A resilient sealing member for use about the marginal edge of a glazing panel mounted in a solar energy collector. The sealing member is cup-shaped for receiving the marginal edge portion of the panel and is formed with a sealing lip bearing against the outboard surface of the glazing panel to provide a fluid tight, pressure seal adjacent the entire periphery thereof. The sealing member is advantageously used in combination with a retainer assembly having a retainer cap that exerts pressure on the sealing member to urge the lip into uniform, pressure sealing contact with such outboard surface.

7 Claims, 6 Drawing Figures

SOLAR ENERGY COLLECTOR

CROSS REFERENCE TO RELATED APPLICATION

This application is a continuation-in-part of applicants' prior application, Ser. No. 892,110, filed Mar. 31, 1978 on a solar energy collector.

BACKGROUND OF THE INVENTION

This invention relates generally to solar energy collectors and, more particularly, to a new and useful flat solar energy collector having an improved pressure sealing member.

Conventional flat solar collectors usually include a rigid enclosure for housing a metallic heat absorbing plate provided with fluid conveying conduits and supported on heat insulating material. The open end of the enclosure is covered by at least one glazing panel, which may be optically transparent glass or plastic, and which is rigidly secured in place by suitable retaining elements. These known, conventional retaining elements posed problems because of the difficulty in removing them when necessary to gain access into the collector unit for repair, removal and/or replacement of damaged glazing panels and other components located within the enclosure. Moreover, such retaining elements are easily broken or otherwise damaged during removal, necessitating replacement when reassembling the collector.

The teachings set forth in applicants' above-referred to co-pending application, Ser. No. 892,110, provided a solution to the above-noted problems by providing a solar energy collector having a novel, easily detachable retainer assembly comprising a retainer cap mechanically interlocked with internal formations provided on the enclosure walls of the collector and a removable spring clip used in conjunction with the retainer cap to maintain the latter in the interlocked relation with such formation.

Another problem associated with conventional flat plate collectors resides in the ingress of moisture or water vapor into the collector, particularly about the region adjacent the peripheral or marginal edge of the exposed, outboard glazing panel. The sealing arrangement employed in most conventional solar collectors to avoid this problem have not been completely satisfactory because they do not provide the requisite fluid tight pressure sealing uniformly along the entire periphery of the glazing panel under all conditions of use and handling. This problem is further compounded by the inherent irregularities formed in the surface of the glazing panel and by the shifting movement of the glazing panel resulting either from internal thermal expansion and contraction within the collector housing during use and/or when the collector is vertically or angularly disposed during handling and shipping and when finally installed at an inclined attitude.

SUMMARY OF THE INVENTION

The primary object of the present invention is to avoid the above sealing problem by providing an improved sealing member offering the requisite sealing pressure about the marginal edge of a glazing panel while permitting rectilinear movement thereof within the associated housing.

Another object of the invention is to employ the foregoing sealing member in combination with a retainer assembly of the type described in application Ser. No. 892,110, to obtain optimum pressure sealing uniformly about the entire peripheral surface of a glazing panel.

The foregoing and other objects, advantages and characterizing features of this invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
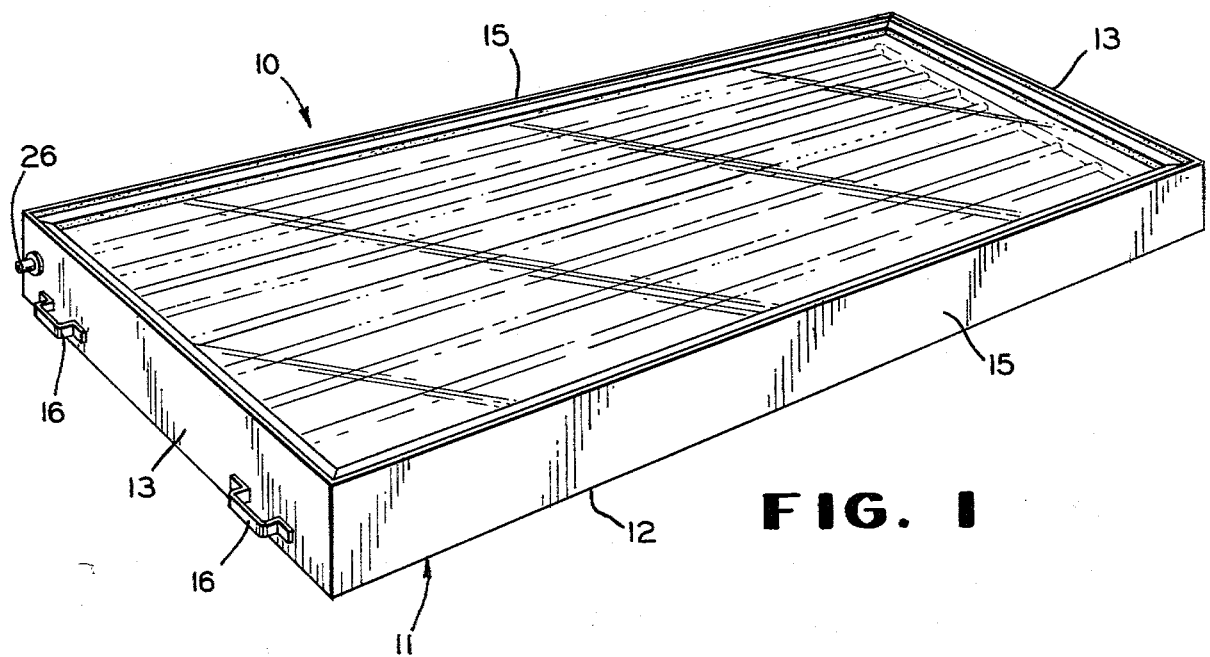
FIG. 1 is a perspective view of a solar energy collector embodying the novel features of this invention.
Figure 2:
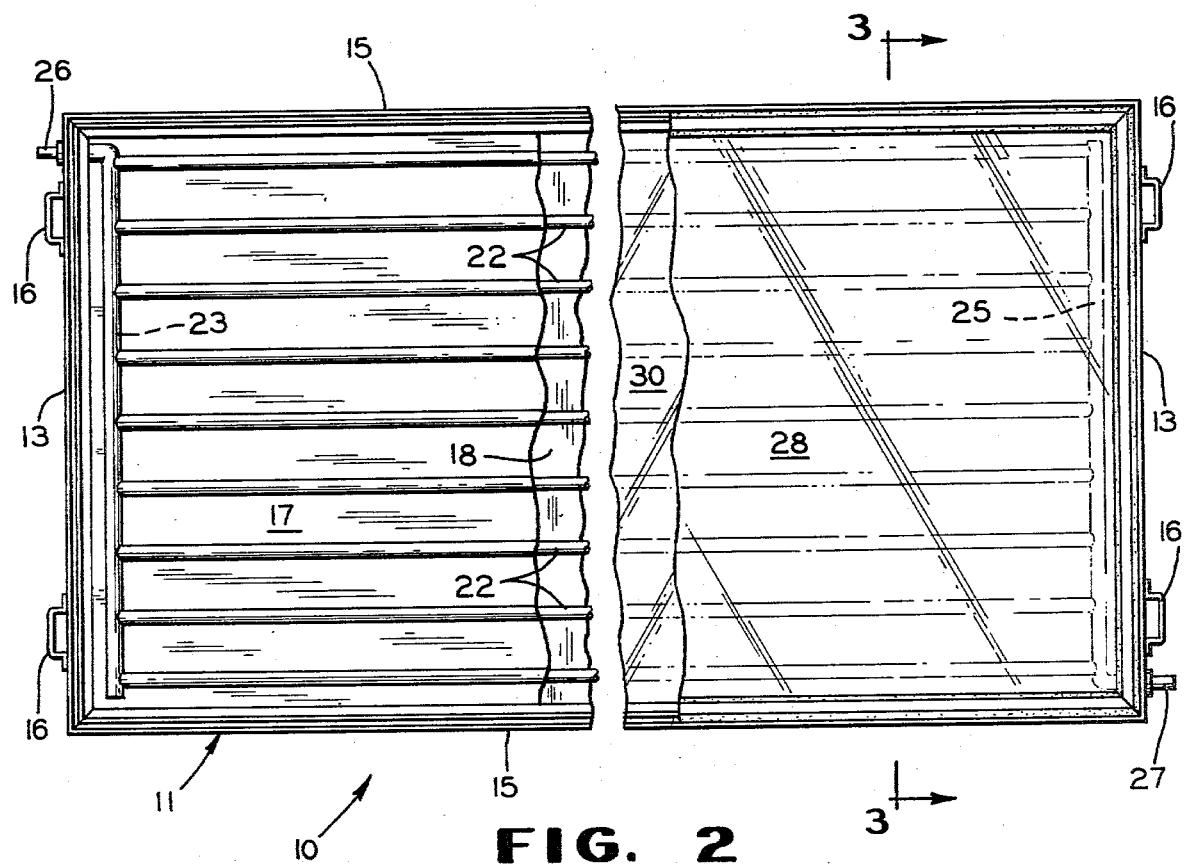
FIG. 2 is a cut-away top plan view of the solar energy collector of FIG. 1, with portions removed for clarity.

Referring now in detail to the illustrative embodiment depicted in the accompanying drawings, there is shown in FIG. 1 a solar energy collector, comprehensively designated 10, constructed in accordance with this invention and embodying certain new features of this invention. The collector 10 comprises a generally rectangularly shaped, box-like housing or enclosure 11 having a base portion or bottom wall 12, a pair of end walls 13, a pair of side walls 15, and an open top covered by glazing as will hereinafter be more fully described. The bottom, end, and side walls can be formed of sheets or strips of a suitable extruded metal, such as aluminum for example, all welded or otherwise suitably secured at their joints to form a rigid, unitary construction possessing sufficient strength to form a component part of a roof, if desired.

A pair of laterally spaced handles 16 are fixed to each end wall 13, or alternately can be attached to the side walls, if desired, to facilitate handling thereof. Also, while the outer surfaces of walls 13 and 15 are substantially planar, their inner surfaces are formed with various inwardly extending protrusions or formations hereinafter more fully described.

Figure 3:
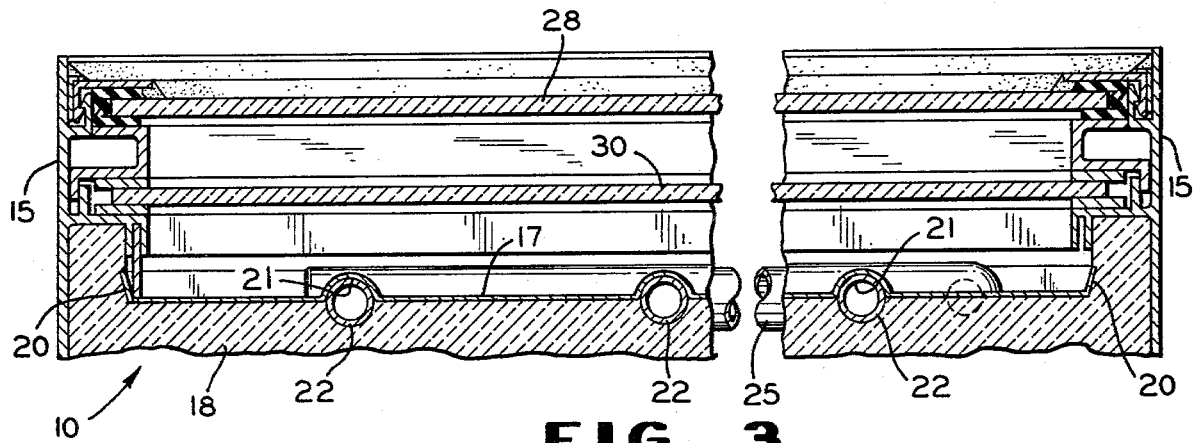
FIG. 3 is a cut-away transverse sectional view, on an enlarged scale, taken along the line 3—3 of FIG. 2.

As best shown in FIG. 3, the enclosure 11 houses a heat collecting or absorbing plate 17 spaced from the bottom wall 12 and supported on a relatively thick layer of heat insulating material 18, such as fiber glass for example, which completely fills the space between the bottom wall 12 and heat absorbing plate 17. The plate 17 is formed with upturned flanges 20 along the sides thereof and a series of longitudinally extending grooves or channels 21 spaced transversely of the plate 17 for receiving a plurality of laterally spaced tubes or conduits 22 soldered or otherwise rigidly secured within the channels 21 of plate 17 to provide a good mechanical contact and thereby optimum heat exchange therebetween. While the heat absorbing plate 17 and conduits 22 can be formed of any suitable heat conducting material, preferably they are formed of copper which offers the highest resistance to corrosion while providing maximum heat transferability. The upper or solar energy exposed surface of the heat absorbing plate 17 can be coated with a radiant energy absorbent material, preferably black in color, to further increase solar energy absorption thereby.

The conduits 22 extend longitudinally of the enclosure 11 and are connected at their one ends to a common header or manifold 23 for delivering ambient fluid to the conduits 22 and at their other ends to a common header or manifold 25 for removing the heated fluid from conduits 22. Manifold 23 is provided with an inlet 26 projecting through one end wall 13 for connection to a piping system delivering ambient fluid thereto and manifold 25 is provided with an outlet 27 projecting through the other end wall 13 for connection to a piping system conveying the heated fluid to a storage area or any desired location for heating purposes.

The solar energy collector of the illustrative embodiment includes two, vertically spaced, transparent glazing panels 28 and 30 preferably formed of tempered glass which possesses the requisite strength to withstand the elevated temperatures generated within the collector and the abuse they are subjected to during handling and in use. These glazing panels 28 and 30 allow the sun's solar rays to pass therethrough but prevent escape of the infrared rays emitted by the heat absorbing plate 17. Glazing panels 28 and 30 are mounted in vertically spaced relation to provide a dead air space therebetween offering optimum thermal insulation and better heat retention within the collector. While preferably two glazing panels are employed in the solar energy collector of the illustrative embodiment, it should be understood that only one glazing panel can be utilized where conditions and economics warrant within the purview of this invention.

Figure 4:
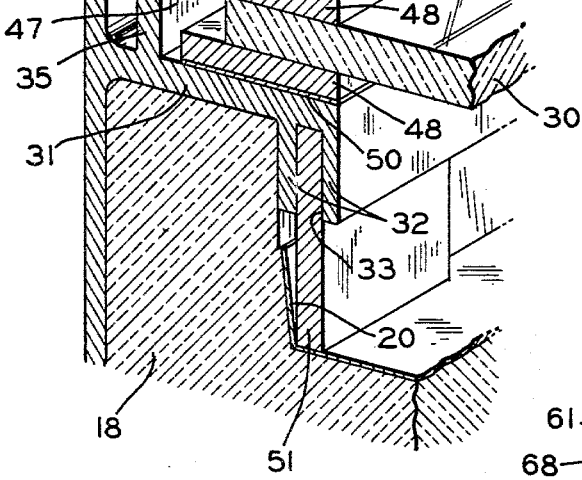
FIG. 4 is a perspective sectional view, on an enlarged scale, showing details of the interior of a solar energy collector constructed in accordance with this invention.

As best shown in FIG. 4, the means for mounting the glazing panels 28 and 30 in their vertically spaced relation comprise the heretofore mentioned internal protrusions which include a protuberance 31 extending inwardly from and substantially normal to side wall 15 and having a pair of spaced fingers 32 adjacent the inner end thereof extending downwardly and defining a channel 33 therebetween. An integral upright extension 35 projects upwardly from protuberance 31 in spaced relation and substantially parallel to side wall 15. Another perpendicularly extending protuberance 36 is located adjacent the upper end of side wall 15 and is provided with a right angularly related, upright extension 37 terminating in an enlarged head formation 38 defining a shoulder 40. The upright extension 37 is spaced from and generally parallel to side wall 15 defining a channel 41 therebetween for a purpose that will hereinafter become apparent.

A generally U-shaped member 42 having its open end facing side wall 15 is supported on the inboard glazing panel 30 with one leg 43 thereof abutting the base of upright extension 37. The other leg 45 is formed with a depending skirt 46 overlying and abutting the upper end of extension 35. The upper leg 43 of member 42 serves as a support for the outboard glazing panel 28 while the lower leg 45, together with protuberance 31, defines a channel opening 47 in which the marginal edge of the inboard glazing panel 30 is located.

For convenience of description, the construction of solar energy collector 10 adjacent one side wall 15 only is shown (FIG. 4) and described in detail. It should be understood that identical structure extends about the entire inner periphery of the collector and that the opposite side wall 15, as well as end walls 13, are provided with the several interior protrusions and construction shown in FIG. 4.

The marginal edge of inboard glazing panel 30 is located in channel 47 and is sandwiched between a pair of woven fiber glass tapes 48, each having a coating of pressure sensitive adhesive 50 applied to the outer surface thereof for adhesively securing the tapes 48 to the leg 45 of member 42 and the upper surface of protuberance 31, respectively. A resiliently yieldable material (not shown) can be deposited at spaced intervals about the periphery of glazing panel 30 between the edge of the latter and extension 35 to maintain panel 30 substantially centered within the enclosure 11 and to preclude excessive rectilinear movements of the panel 30 when the collector is placed on edge vertically or at an angle during handling and/or storage.

A series of insulating spacers 51 are interposed between the heat absorbing plate 17 and inboard glazing panel 30 to maintain a predetermined spacing therebetween. The upper ends of the spacers 51 are received in channel 33 of protuberance 31 and engage the plate 17 at their respective lower ends. The spacers 51 are located at longitudinally spaced intervals along the sides of heat absorbing plate 17 adjacent the flanges 20 thereof to prevent upward displacement of the plate 17 relative to inboard glazing panel 30. This maintains the upper edge of flanges 20 spaced from fingers 32 and other metallic components to preclude heat transmission and losses therethrough from the heated plate 17 to the enclosure walls.

As earlier noted, a serious problem in many conventional solar collectors is the leakage of moisture past the seal employed along the marginal edge of the exposed glazing panel and into the collector housing. This may be due to the deterioration of the seal under extreme thermal conditions or the absence of uniform sealing throughout the entirety of the seal against the glass panel surface, which often is formed with minute irregularities thereon further compounding the leakage problem. In any event, such leakage, when subjected to the high temperatures generated by the solar energy absorbing plate, can produce condensation on the undersurface of the glazing panels to materially reduce the transmission of solar energy therethrough.

The present invention addresses this problem and provides a solution therefor by the provision of a specially configurated gasket or sealing member, generally designated 55, extending about the marginal edge of the outboard glazing panel 28 to positively form a fluid tight seal therewith and prevent the ingress of moisture into the collector enclosure and to preclude the escape of heated air from within the enclosure. Sealing member 55 preferably is composed of heat resistant rubber, but may be formed of any other suitable resiliently yieldable, elastomeric material having similar properties of durability and high abrasion resistance, adequate compression and expansion capabilities, and capable of withstanding temperature extremes. Sealing member 55 is extruded in an indeterminate length and cut into strips which are bonded or otherwise rigidly secured at their joints to form a unitary, one-piece construction having an endless outline in plan conforming to the marginal edge or outline of the glazing panel with which it is to be used.

Figure 5:
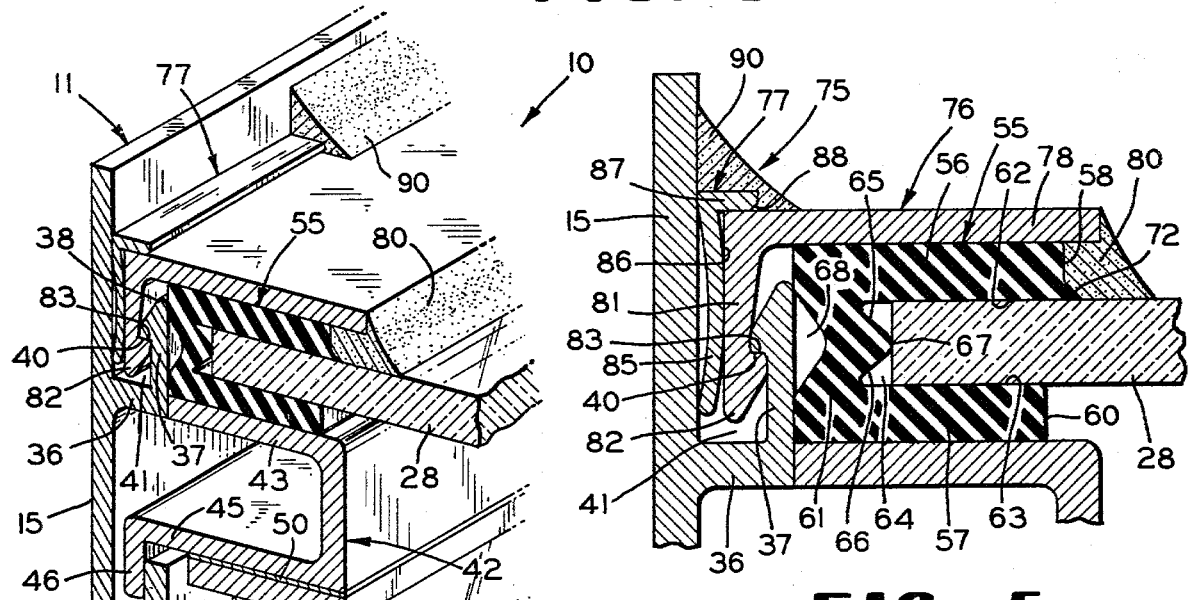
FIG. 5 is an enlarged, fragmentary transverse sectional view of a portion of the solar energy collector incorporating the specially configured sealing member of this invention.
Figure 6:
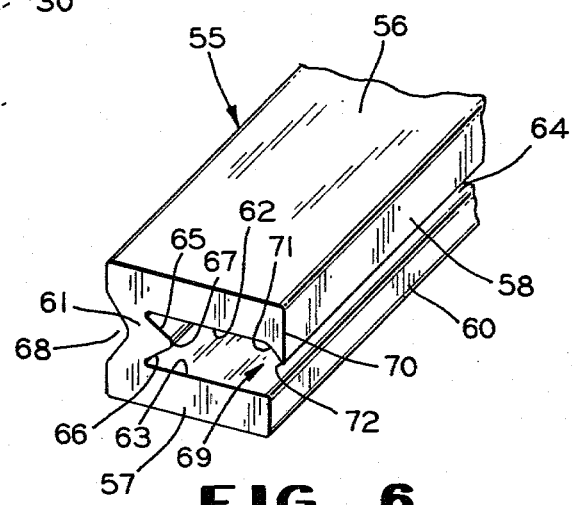
FIG. 6 is a perspective view of one end of a sealing member constructed in accordance with this invention and shown in its natural uncoompressed state, being broken away to indicate an indeterminate length.

As best shown in FIGS. 5 and 6, sealing member 55 is of a generally U-shaped configuration in cross sectional configuration and is normally disposed on its side in use. Sealing member 55 comprises an upper leg or wall 56 and a lower leg or wall 57 terminating in end faces or edges 58 and 60, respectively, and are connected together at their inner ends by a side wall 61. The upper and lower walls 56 and 57 are substantially parallel and have opposed glass bearing surfaces 62 and 63 spaced from each other to define a groove 64 therebetween for receiving the marginal edge portion of the glazing panel 28 and which bear against the opposite surfaces of the glazing panel. As used herein, the terms upper, lower, top, bottom, horizontal, vertical and the like are applied only for convenience of description with reference to FIGS. 5 and 6 and should not be taken as limiting the scope of this invention.

The side wall 61 is formed with a pair of sloping or inclined portions 65 and 66 extending inwardly from the ends of walls 56 and 57 in a converging relation and meeting at an apex to provide a rib 67 adapted to engage the marginal edge of glazing panel 28 substantially vertically midway along such edge. The outer surface of wall 61 is formed with a cavity 68 defining a clearance area for lateral deformation of side wall 61, such as occurs when the glazing panel is shifted somewhat laterally due to the collector being oriented vertically or at any angular attitude relative to a true horizontal. The particular configuration of side wall 61 maintains the glazing panel 28 substantially centered within its enclosure but will yield laterally to accommodate rectilinear movement of the glazing panel 28.

The upper wall 56 of sealing member 55 is formed at its distal edge 58 with a downwardly directed extension 69 having an outer flat surface 70 substantially flush with the upper wall edge 58 (FIG. 6) and an inner, generally arcuate surface 71 curving downwardly from the bearing surface 62 of wall 56 and joining surface 70 at an apex to form therewith a sealing lip 72 extending lengthwise of sealing member 55. This lip 72 is readily deformed outwardly as shown in FIG. 5 under the influence of a downwardly directed force to provide an effective, fluid tight, pressure sealing edge against the outer or outboard surface of glazing panel 28 to preclude moisture or gaseous seepage therebetween. While the sealing member 55 has been described in use with a glazing panel utilized in a solar collector, it should be appreciated that the sealing member of this invention is not restricted thereto, but has utility in any glazing closure application.

The effectiveness of sealing member 55 is enhanced when used in combination with a removable retainer assembly, generally designated 75, of the type constructed in accordance with the invention disclosed and claimed in patent application Ser. No. 892,110. The retainer assembly 75 comprises a first element in the form of a retainer cap 76 mechanically interlocked with a portion of the enclosure as will hereinafter be more fully described and a second element in the form of a resiliently yieldable spring or lock clip 77 maintaining the former in such interlocked relation with the enclosure. The retainer cap 76 consists of a sheet metal fabrication of unitary, one-piece construction formed to provide a horizontally extending, inwardly projecting flange 78 overlying the marginal edge of outboard panel glazing 28 and resting on the upper wall 56 of sealing member 55. As shown in FIG. 5, the flange 78 extends inwardly past the edge 58 of sealing member 55 in spaced relation to the outboard glazing panel 28. The void between glazing panel 28 and retainer flange 78 outwardly of the upper wall edge 58 of sealing member 55 is filled with a mastic sealant material 80 to provide an outer or first fluid tight seal between the retainer cap 76 and glazing panel 28. While sealant 80 offers the first impediment to fluid leakage, it should be appreciated that the bond between the sealant and the retainer or the glazing panel is sometimes broken under the strain of physical stresses during handling and use and/or may be faulty when initially formed. In either event, should fluid penetrate the sealant 80, it would be blocked by the sealing member 55, which serves as a back-up pressure seal positively preventing the passage of fluid therepast. While preferably the sealant 80 is formed of silicone, it should be appreciated that any suitable, fluid impermeable sealant can be used, as desired.

The retainer cap 76 also is formed with a vertical leg 81 extending downwardly from flange 78 for insertion into the channel 41 formed between side wall 15 and upright extension 37. A tapered head 82 is formed on the distal end of leg 81 and defines a shoulder 83 adapted to engage behind the shoulder 40 on extension 37. This arrangement provides a mechanical interlock detachably securing retainer cap 76 to the enclosure 11.

The clip 77 consists of a sheet metal fabrication of unitary, one piece construction formed to provide an elongated body having a downwardly extending tongue portion 85 adapted to be wedged into channel 41 with a friction fit into the remaining space left between the outer flat face of retainer cap leg 81 and the inner surface of side wall 15. The tongue portion 85 is arched or curved in transverse cross section, to provide a central, arcuately curved bearing surface 86 (FIG. 5) for biased engagement against the outer face of leg 81 and forms a tight connection therewith. The opposite ends of tongue portion 85 retreat away from the arcuately curved central portion and engage side wall 15 in the assembled relation shown in FIG. 5. This bowed configuration of tongue portion 85 serves as a bias, urging the retainer cap leg 81 inwardly to prevent displacement of tapered head 82 from behind shoulder 40. A feature of this retainer cap-spring clip combination is that the arcuately configurated tongue 85 bears along its surface 86 against retainer cap leg 81 at a point above the contact point where shoulder 83 of tapered head 82 engages shoulder 40. The lateral inward force exerted by clip tongue 85 tends to pivot the retainer cap 76 about a fulcrum located at the point of contact between shoulders 83 and 40, causing the flange 78 of retainer cap 76 to bear downwardly against the upper wall 56 of sealing member 55, pressing the latter against the glazing panel outer surface. The downward force exerted by flange 78 increases progressively outwardly from the juncture of flange 78 with leg 81 toward the free edge of flange 78, thereby progressively increasing the pressure along the underlying sealing member 55 toward its outer edge 58. As a result, maximum sealing pressure is applied where most effective; namely, at the sealing member edge 58 in the region of sealing lip 72 to force the latter inwardly into tight sealing engagement with the outer surface of glazing panel 28 and positively preclude moisture penetration therethrough in the event of failure of the sealant 80. Since the flange 78 is continuous and coextensive with lip 72 along the periphery of glazing panel 28, the pressure sealing applied by the lip 72 against panel 28 is uniform throughout the length of the lip 72.

One end of tongue portion 85 is provided with a horizontally extending lip or flange 87 overlying the retainer cap flange 78 adjacent the intersection thereof with leg 81. The free end of clip flange 87 is beveled, as shown at 88, to facilitate insertion of a screw driver or another appropriate work tool therebeneath to pry the wedged clip 77 upwardly for removing the same when desired or required. A suitable mastic sealant material 90 completely encapsulates clip flange 87 and a portion of the retainer cap flange 78 to provide a fluid tight seal therebetween.

From the foregoing, it is apparent that the present invention fully accomplishes its intended objects by providing a new and useful sealing member for use about the marginal edge of a glazing panel. The cup-shaped sealing member is provided with an end wall configurated to provide an internal rib engageable with the marginal edge of the glazing panel about the entire periphery thereof to center the panel within its enclosure and an outer cavity to provide a clearance space for accommodating sealing member deformation upon rectilinear shifting movement of the glazing panel relative to its housing. By the provision of a sealing lip forming a continuation of an edge of the sealing member, pressure sealing is assured against the exposed surface of the glazing panel adjacent the marginal edge thereof. The effectiveness of such sealing lip is greatly enhanced when used in combination with a retainer assembly of the type disclosed in pending patent application Ser. No. 892,110, because of the pressure exerted thereby to press the lip against the glazing panel surface with uniform pressure therealong.

It is to be understood that the form of the invention herein shown and described is to be taken as an illustrative embodiment only of the same, and that various changes in the shape, size and arrangement of parts may be resorted to without departing from the spirit of the invention.

We claim:

1. A sealing member comprising: an elongated elastic body of generally U-shaped configuration in cross section and formed of resiliently yieldable material; said body having a side wall and a pair of walls in spaced, parallel relation formed integral with said side wall for slip fitted engagement over the marginal edge of a glazing panel; said spaced walls terminating in generally flat edges; one of said spaced walls having a sealing lip formed integral therewith adjacent the associated edge and extending toward the other wall; said side wall comprising a pair of inclined portions extending inwardly from the inner edges of said spaced walls in a converging relation and meeting at an apex to form a rib lengthwise of said body for engagement with the peripheral edge of said glazing panel to maintain said panel centered within said elastic body; said inclined portions defining a cavity behind said apex for accommodating displacement of said inclined portions upon rectilinear movement of said glazing panel within said elastic body.

2. A sealing member according to claim 1, wherein said spaced walls have opposed glass bearing surfaces defining a groove therebetween for receiving the marginal edge portion of a glazing panel.

3. A sealing member according to claim 2, wherein said sealing lip comprises an outer straight surface substantially flush with the edge of said one wall and forming a continuation thereof and an inner, arcuate surface curving away from the glass bearing surface of said one wall and joining said straight surface at an apex to form a pressure sealing edge lengthwise of said sealing member.

4. A sealing member according to claim 1, in combination with means for mounting a glazing panel within an enclosure, said mounting means comprising a retainer assembly including a first element and a second element, said first element having a portion for interlocking engagement with a protrusion formed within said enclosure and a right angularly related flange adapted to overlie a marginal edge portion of said glazing panel in spaced relation thereto, said one spaced wall of said sealing member disposed between said flange and said glazing panel with said sealing lip in pressure sealing engagement against said glazing panel.

5. The combination according to claim 4, wherein said second element of said retainer assembly includes a tongue portion bearing against said first element portion for urging the same in said interlocking engagement with said protrusion and causing said flange to bear against said one wall of said sealing member to press said sealing lip against said glazing panel.

6. The combination according to claim 4, wherein said first element portion is formed with an enlarged head formation at the distal end thereof adapted to fit behind a shoulder formed on said protrusion and said second element comprises a tongue portion disposed between said first element portion and said enclosure with a friction fit therebetween for urging said first element portion in said interlocking engagement with said protrusion and causing said flange to bear against said one wall of said sealing member to press said sealing lip against said glazing panel.

7. A sealing member according to claim 1, in combination with means for mounting a glazing panel within an enclosure, said mounting means comprising a retainer assembly including a first element and a second element, said first element having a portion for interlocking engagement with a protrusion formed within said enclosure and a right angularly related flange adapted to overlie a marginal edge portion of said glazing panel in spaced relation thereto, said one spaced wall of said sealing member disposed between said flange and said glazing panel with said sealing lip in pressure sealing engagement against said glazing panel, said first element portion being formed with an enlarged head formation at the distal end thereof adapted to fit behind a shoulder formed on said protrusion, and said second element comprising a tongue portion disposed between said first element portion and said enclosure with a friction fit therebetween for urging said enlarged head formation into engagement behind said shoulder and causing said flange to bear against said one wall of said sealing member to press said sealing lip against said glazing panel.

* * * * *